Figure 5:
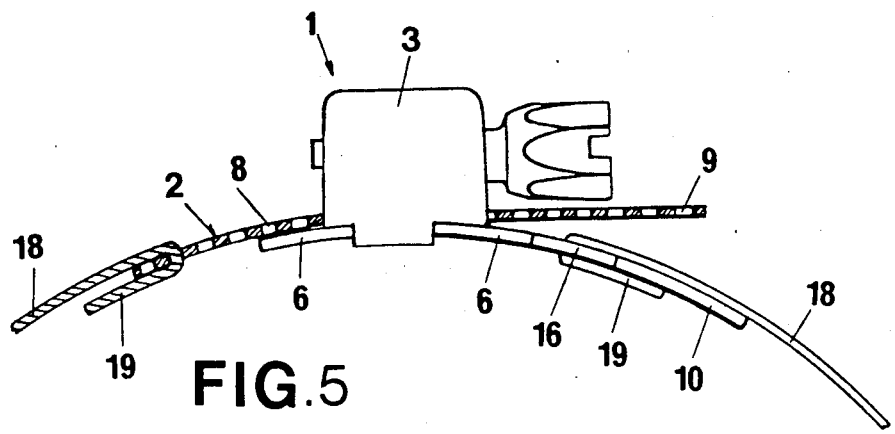

United States Patent [19]

Bäkdahl

[11] Patent Number: 4,686,747
[45] Date of Patent: Aug. 18, 1987

[54] WORM DRIVE CLIPS

[76] Inventor: Samuel Bäkdahl, Östvänget 4, DK-7480 Vildbjerg, Denmark

[21] Appl. No.: 875,676

[22] Filed: Jun. 18, 1986

Related U.S. Application Data

[63] Continuation of Ser. No. 666,326, Oct. 30, 1984, abandoned.

[51] Int. Cl.⁴ .............................................. B65D 63/00
[52] U.S. Cl. ............................ 24/274 R; 24/274 WB; 24/279
[58] Field of Search .......... 24/274 R, 274 P, 274 WB, 24/275, 279, 280–282, 17 A, 21, 19

[56] References Cited

U.S. PATENT DOCUMENTS

| | | | |
|---|---|---|---|
| 1,992,505 | 2/1935 | Prosky | 24/274 R X |
| 2,452,806 | 11/1948 | Tetzlaff | 24/274 R |
| 2,910,758 | 11/1959 | Arthur | 24/274 R |
| 3,405,432 | 10/1968 | Scaravelli | 24/274 R |
| 4,307,495 | 12/1981 | Sadler | 24/274 R |
| 4,445,254 | 5/1984 | Allert | 24/274 R |

FOREIGN PATENT DOCUMENTS 1123890 10/1956 France ................. 24/274 R
1445626 6/1966 France ................. 24/274 R Primary Examiner—Peter A. Aschenbrenner
Assistant Examiner—Laurie K. Cranmer
Attorney, Agent, or Firm—Antonelli, Terry & Wands

[57] ABSTRACT

A worm drive clip comprises a housing having a driving worm screw inserted therein, with the housing comprising an upper part and a bottom part for enclosing the worm screw and a flexible band with transverse ribs and transverse openings inserted in the housing. The band has transverse ribs and transverse openings equally spaced along its full length. The bottom part of the housing has means engageable with at least one transverse rib and/or at least one transverse opening of the band at one end of the band. The worm screw is engageable with the transverse ribs and the transverse openings at the other end of the band. Thereby a worm drive clip is obtained with a housing which is easy to fasten to a perforated band in situ, where it is desired to use the band with the housing of the worm drive clip, whereby a length of band, which is a little longer than the periphery of a hose, may be cut off for clamping on the hose of an arbitrary diameter, whereupon the housing of the worm drive clip may be mounted on the band piece for clamping the hose.

4 Claims, 7 Drawing Figures

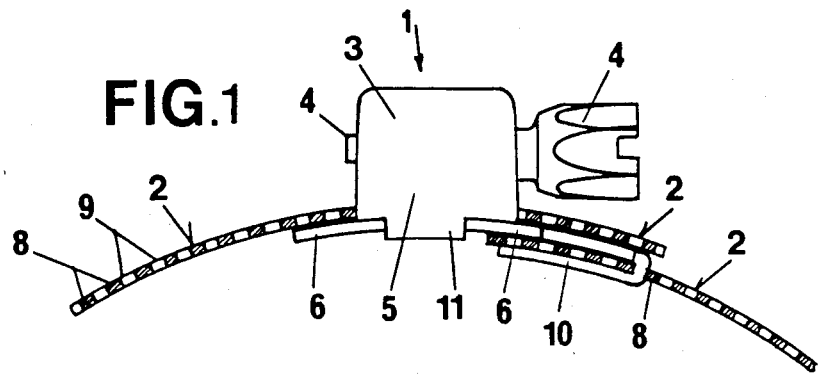
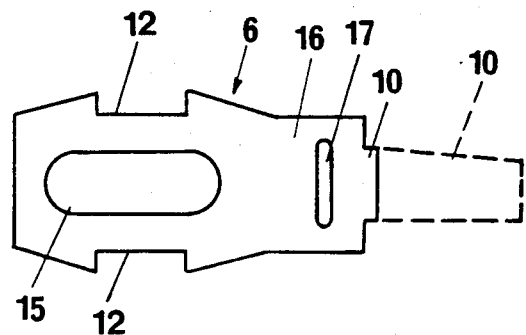
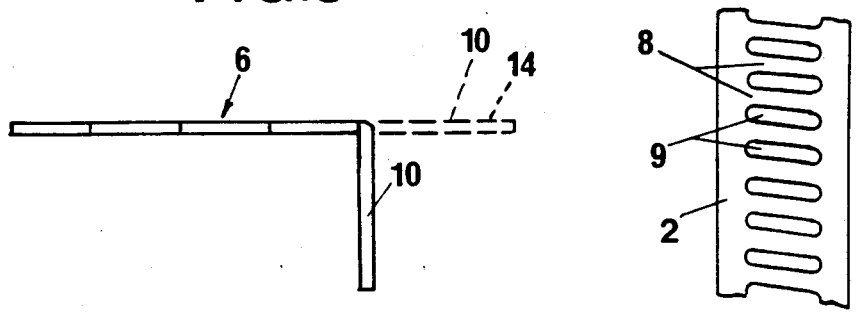

WORM DRIVE CLIPS

This is a continuation of application Ser. No. 666,326, filed Oct. 30, 1984, now abandoned.

This invention relates to a worm drive clip of the kind comprising a housing in which a driving worm screw is journalled, the housing comprising an upper part and a bottom part for enclosing the worm screw, and a flexible band inserted in the housing and engageable with the worm screw via transverse ribs and transverse openings formed in the band for permitting tightening of the band about an object, such as a hose, by rotating the worm screw about its longitudinal axis.

The worm drive clip according to the invention is characterized in that the band has transverse ribs and transverse openings equally spaced in the full length of the band, the bottom part of the housing has means engageable with at least one transverse rib and/or at least one transverse opening of the band at one end of the band and the worm screw is engageable with the transverse ribs and the transverse openings at the other end of the band. Thereby a worm drive clip is obtained with a housing which is easy to fasten to a perforated band in situ, where it is desired to use the band with the housing of the worm drive clip, whereby a length of band, which is a little longer than the periphery of a hose, may be cut off for clamping on the hose of an arbitrary diameter, whereupon the housing of the worm drive clip may be mounted on the band piece for clamping the hose. In the preferred embodiment the housing bottom part comprising a flap of a ductile, bendable material projecting in the longitudinal direction of the housing to be inserted in a transverse opening of the band between a pair of adjacent transverse ribs. Thus, a very simple worm drive clip is obtained which can be used for the known bands of an arbitrary length having transverse ribs and openings, seeing that a certain cut length of band at its one end is fastened to the bottom part of the housing of the worm drive clip by inserting the projecting flap thereof in a transverse opening between a pair of adjacent transverse ribs in the band and a subsequent bending backwards of the flap to a position parallel to the remaining bottom part of the housing for clamping of the band end to the bottom part of the housing. The other free end of the band is then inserted in the worm drive housing in a known way for engagement with the driving worm screw and a subsequent tightening of the band around a pipe, a hose or the like which it is desired to tighten along its periphery.

The bottom part of the housing may have a protruding intermediate piece between the upper part of the housing and the flap, and the intermediate piece may comprise a transverse opening for an unperforated band of the same width as the length of the transverse opening, the latter having the same length as the transverse openings in the band for engagement with the driving worm screw of the housing.

By these features is achieved that the worm drive clip also is applicable for extremely large pipe or hose diameters, as the unperforated band may be inserted through the transverse opening of the intermediate piece and a subsequent bending backwards of the band to a position parallel to the flap, and wherein the other end of the unperforated band is connected to the band having transverse ribs and openings by inserting the unperforated band in one of the openings and subsequently bending its free end backwards to a position parallel to the band having transverse ribs and openings. By means of a short cut band piece having transverse ribs and openings engaging the driving worm screw of the housing, the unperforated band can be tightened by means of the housing of the worm drive clip.

The transverse opening of the intermediate piece may provide a space for inserting an unperforated band in at least two layers.

By this feature is achieved that the unperforated band may be put almost twice around the pipe or hose, which it is desired to tighten along its periphery, so that the cut band having transverse ribs and transverse openings may be used to clamp two windings of unperforated band. The transverse opening of the intermediate piece has the same length as the width of the unperforated band and preferably such a width that the second winding of the unperforated band is not given a too small bending radius along its extension through the transverse opening of the intermediate piece.

The invention will now be described in more detail by way of example and with reference to the drawings in which FIG. 1 shows a section of a worm drive clip according to the invention having a flexible band with transverse ribs and transverse openings, FIG. 2 the bottom part of the housing of the worm drive clip seen from above, FIG. 3 the bottom part of the housing of the worm drive clip seen from one side, FIG. 4 a cut piece of a band having transverse ribs and transverse openings, FIG. 5 a worm drive clip having a short piece of band with transverse ribs and transverse openings for tightening an unperforated band in one single winding or turn, FIG. 6 the worm drive clip of FIG. 5 wherein the unperforated band, partly in section, is laid in two windings or turns, and FIG. 7 the bottom of the housing having a transverse opening in the intermediate piece.

FIG. 1 shows the main part of a worm drive clip 1 with a band 2, with the worm drive clip 1 comprising a housing 3 having a driving worm screw 4 inserted therein, which worm screw can be turned by means of a tool, such as a wrench or a screwdriver. The housing comprises an upper part 5 and a bottom part 6 for enclosing the worm screw 4. A passage is provided between the bottom part 6 and the screw 4 for enclosing the band 2 inserted in the housing 3, with the band 2 having transverse ribs 8 and transverse openings 9. In the longitudinal direction of the housing 3 the bottom part 6 has a projecting flap 10 of a ductile, bendable material to be inserted in one opening 9 of the band 2 between a pair of adjacent transverse ribs 8. FIG. 1 shows the flap 10 being inserted in one of the openings 9 at the one end of the band 2 and bent rearwards to the shown position parallel to the band 2 and to the bottom part 6 of the housing for clamping of the band end to the bottom part 6 of the housing 3.

The upper part 5 of the housing 3 comprises a fastening flap at both sides, said flaps being brought past a groove 12 in the bottm part 6 and bent around the bottom part 6 for fastening thereof to the upper part 5. The dotted line in FIG. 2 shows the flap 10 before its angular bending and in unbroken lines the angularly bent flap 10. The flap 10 may as shown be bent along a line perpendicular to the length axis of the bottom part 6, but may also be bent along a line forming a small angle with the cross direction of the bottom part. The latter angle has the same size as the angle of the transverse openings 9 with the rightangled cross direction of the band shown in FIG. 4. The one side 14 of the flap 10 may have an inclining cut, viz. under the same small angle with the longitudinal direction of the bottom part 6 as the angle of the transverse openings 9 with the 90°-cross direction of the clamp. Thereby the flap 10 may be bent backwards, whereby no corner of the flap protrudes outside the band 2. Furthermore, a longitudinal opening 15 is preformed in the bottom part 6, which opening provides a space for the driving worm screw 4, as the threads thereof project through the transverse openings 9 in the band 2 and a certain distance down into the opening 15. Furthermore, the bottom part 6 comprises an intermediate piece 16 wherein a cross opening 17 is preformed so as to enable an unperforated band 18 (FIG. 5) of an arbitrary length and made of a ductile, bendable material to pass therethrough.

FIG. 5 shows the housing 3 of the worm drive clip 1 wherein the bottom part 6 engages a short cut length of a band 2 having transverse ribs 8 and transverse openings 9, through a transverse opening 9, of which an end of an unperforated band 18 has been inserted and bent backwards. The band 18 is at its opposite end put through the transverse opening 17 in the bottom part 6 in the intermediate piece 16 between the housing 3 and the flap 10. This construction is suitable in cases where the band 2 should have been extended over a very large diameter, seeing that a substantial part of the costly band 2 has been substituted by a cheaper, unperforated band 18. FIG. 6 shows the same as FIG. 5, however, with the unperforated band 18 being put twice through the transverse opening 17, firstly with a bent flap 19 and secondly with an additional winding 20. FIG. 7 illustrates that the transverse opening 17 having the same length as the width of the unperforated band 18, may have a larger extension in the longitudinal direction of the bottom part 6 than shown in FIG. 2. The unperforated band 18 has the same width as the length of the transverse opening 17 which again has the same length as the length of each transverse opening 9 in the band 2 adapted for engaging the driving worm screw 4 of the housing 3. FIGS. 5 and 6 show in section a part of the unperforated band 18, 20. For the sake of clarity also the band 2, provided with transverse ribs 8 and transverse openings 9, is shown in section.

Figure 6:
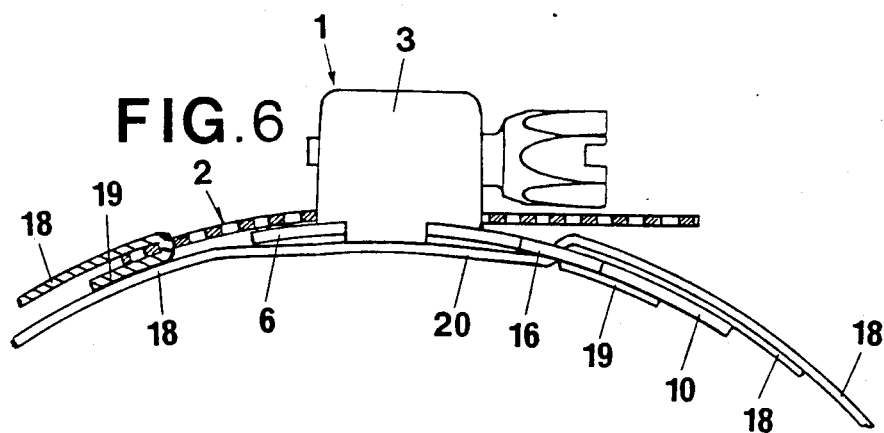
Figure 7:
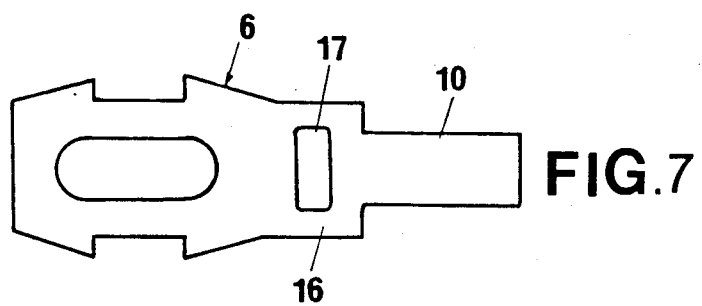

The embodiment of this invention as shown in FIG. 1 is suitable for clips or clamps of small dimensions, e.g. for clamping diameters of 10 mm to 100 mm, and the embodiment of FIGS. 5 and 6 is suitable for clamping diameters of 50 mm to 100 cm or more. Thus, from a roll of band with transverse ribs 8 and transverse openings 9 both hose clamps, clips or binders, straps, cable clamps, pipe clamps, pipe binders for arbitrary diameters of hoses and pipes or cables may be prepared in situ, so that a repairer does not have to bring along a large selection of worm drive clips for different hose diameters; it is sufficient to bring a number of housings 3 comprising upper parts 5, bottom parts 6 and driving worm screws 4, and a roll of band 2 comprising transverse ribs 8 and transverse openings 9, and possibly also a roll of unperforated band 18 for hoses of very large diameters.

This also applies for workshops and factories dealing in hose clips, seeing that their store of such clips may be considerably reduced, anyway as the worm drive housings 3 themselves are concerned, which may be used for all cut off or not yet cut off lengths of perforated or unperforated 18 bands.

The means in the bottom part 6 of the housing 3 being engageable with at least one transverse rib and/or at least one transverse opening of the band at one end of the band may be a transverse end face of the bottom part, so that one end of the band may be inserted into and through the housing along the inner side face of the bottom part 6, whereafter the end of the band is bent around the transverse end face of the bottom part into locking engagement with this.

The means may also be cams or projections at the inner side face of the bottom part engageable with transverse ribs and openings of the band end. Then the band end may be inserted into the housing beyond the worm screw and engaged with the cams or projections which optionally may be formed as a saw tooth to facilitate insertion and impede pulling out the band end.

In both last mentioned embodiments the maximum distance from the bottom part to the worm screw core shall correspond to the double thickness of the band.

I claim:

1. Worm drive clip comprising a housing, a driving worm screw journalled in the housing with an axis of the worm screw extending in a longitudinal direction of the housing, said housing comprising an upper part and a bottom part for enclosing the worm screw, and a flexible band one end of which is insertable in the housing in a gap between the worm screw and the bottom part and engageable with the worm screw via slanted transverse ribs and slanted transverse slots formed in the band, the bottom part of the housing includes means engageable with one transverse slot of the band at the other end of the band, wherein said means engageable with said one transverse slot of the band comprises a flap of a ductile, bendable material connected to the bottom part and projecting freely outwardly from said housing to form an end of said bottom part extending in the longitudinal direction of the housing, said flap having a width slightly less than the length of the transverse slots of the band so that the free end thereof can be inserted in and with a certain length through a transverse slot of the band between a pair of transverse ribs, and wherein all of the transverse slots of the band are slanted and positioned equally spaced by the transverse ribs along an entire length of the band, the transverse ribs being slanted in conformance with a pitch of the worm screw, the flap in a mounted position of the worm drive clip around a cylindrical body after insertion through the selected slot being bent backwards so that said certain length of said flap is wedged between the bend and the cylindrical body.

2. Worm drive clip according to claim 1 wherein the bottom part has an intermediate piece of sheet metal between the upper part of the housing and the flap, and the intermediate piece comprises a transverse opening having substantially the same length as the slanted transverse slots in the band.

3. Worm drive clip comprising a housing, a driving worm journalled in the housing with an axis of the worm screw extending in a longitudinal direction of the housing, said housing comprising an upper part and a bottom part for enclosing the worm screw, and a flexible band one end of which is insertable in the housing in a gap between the worm screw and the bottom part and engageable with the worm screw via slanted transverse ribs and slanted transverse slots formed in the band, the bottom part of the housing including a flap of a ductile, bendable material connected to the bottom part and projecting freely outwardly from said housing to form an end of said bottom part extending in the longitudinal direction of the housing, said bottom part further including an intermediate piece of sheet metal between the upper part of the housing and the flap, the intermediate piece comprising a transverse opening having a length which permits the other end of the flexible band to be inserted therethrough and the transverse opening of the intermediate piece having a width which is at least twice the thickness of said band to allow the band to be extended twice through said transverse opening to allow the band to be wrapped twice around a body upon which it is to be tightened.

4. Worm drive clip according to claim 3, wherein the transverse opening of the intermediate piece has a width which is at least twice the width of the slanted transverse slots.

* * * * *